United States Patent
Brannan

(10) Patent No.: US 12,541,785 B2
(45) Date of Patent: Feb. 3, 2026

(54) CHATBOT TO ASSIST IN VEHICLE SHOPPING

(71) Applicant: STATE FARM MUTUAL AUTOMOBILE INSURANCE COMPANY, Bloomington, IL (US)

(72) Inventor: Joseph Robert Brannan, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 152 days.

(21) Appl. No.: 18/234,151

(22) Filed: Aug. 15, 2023

(65) Prior Publication Data

US 2024/0296489 A1    Sep. 5, 2024

Related U.S. Application Data

(60) Provisional application No. 63/525,755, filed on Jul. 10, 2023, provisional application No. 63/452,014, (Continued)

(51) Int. Cl.
*G06Q 30/00* (2023.01)
*G06F 40/40* (2020.01)
(Continued)

(52) U.S. Cl.
CPC ......... *G06Q 30/0631* (2013.01); *G06F 40/40* (2020.01); *G06Q 30/0206* (2013.01); *G06Q 30/0627* (2013.01); *G06Q 40/08* (2013.01)

(58) Field of Classification Search
CPC .................................................. G06Q 30/0631
See application file for complete search history.

(56) References Cited

U.S. PATENT DOCUMENTS

| 7,523,060 B1 | 4/2009 | Tenorio |
| 8,682,804 B1 | 3/2014 | Yoon |

(Continued)

FOREIGN PATENT DOCUMENTS

| CN | 110175229 A | 8/2019 |
| CN | 114742657 A | 7/2022 |

(Continued)

OTHER PUBLICATIONS

Panjaitan, Hapizin Yonani, and Renny Risqiani. "Antecedents of Customer Satisfaction Towards Chatbot on Used Car Buying and Selling Platforms in Indonesia." APMBA (Asia Pacific Management and Business Application) 12.3 (2024): 315-334.*

(Continued)

*Primary Examiner* — Kathleen Palavecino
(74) *Attorney, Agent, or Firm* — MARSHALL, GERSTEIN & BORUN LLP

(57) ABSTRACT

Methods for systems generating recommendations regarding a vehicle purchase are disclosed. An artificial intelligence (AI) or machine learning (ML) chatbot or voicebot is provided to receive input from a user, determine information regarding a type of vehicle based upon the input, and generate a total cost of ownership of the type of vehicle for presentation to the user. The chatbot may apply a natural language processing (NLP) algorithm to a text input to generate an intermediate input for use in determining the total cost of ownership. The voicebot may apply an audio recognition algorithm to an audio input to generate text, which may then be processed by the voicebot or the chatbot using an NLP algorithm to generate an intermediate input for use in determining the total cost of ownership.

20 Claims, 4 Drawing Sheets

Related U.S. Application Data filed on Mar. 14, 2023, provisional application No. 63/449,691, filed on Mar. 3, 2023.

(51) Int. Cl.
  *G06Q 30/0201* (2023.01)
  *G06Q 30/0601* (2023.01)
  *G06Q 40/08* (2012.01)

(56) References Cited

U.S. PATENT DOCUMENTS

| | | |
|---|---|---|
| 10,107,708 B1 | 10/2018 | Schick et al. |
| 10,409,995 B1 | 9/2019 | Wasiq et al. |
| 10,733,383 B1 | 8/2020 | Shah et al. |
| 11,017,466 B1 | 5/2021 | Cunningham et al. |
| 11,238,521 B2 | 2/2022 | Malkiel et al. |
| 11,270,331 B1 | 3/2022 | Breitweiser et al. |
| 11,314,846 B1 | 4/2022 | Colin et al. |
| 11,444,893 B1 | 9/2022 | Kalluri |
| 11,593,685 B1 | 2/2023 | Chan et al. |
| 11,595,243 B1 | 2/2023 | Schreiber et al. |
| 11,645,253 B1 | 5/2023 | Xing et al. |
| 11,676,202 B1* | 6/2023 | Latronico .......... G06Q 30/0641 705/37 |
| 11,726,889 B1 | 8/2023 | Rao et al. |
| 11,763,148 B2 | 9/2023 | Milman et al. |
| 11,803,849 B1 | 10/2023 | Lawrence |
| 11,900,451 B1 | 2/2024 | King et al. |
| 11,929,963 B1 | 3/2024 | Zheng |
| 11,942,079 B2 | 3/2024 | Chun et al. |
| 2006/0195335 A1 | 8/2006 | Christian et al. |
| 2008/0196099 A1 | 8/2008 | Shastri |
| 2010/0161503 A1 | 6/2010 | Foster |
| 2012/0054040 A1 | 3/2012 | Bagherjeiran et al. |
| 2013/0191223 A1 | 7/2013 | Harris et al. |
| 2015/0128246 A1 | 5/2015 | Feghali et al. |
| 2016/0156574 A1 | 6/2016 | Hum et al. |
| 2016/0260033 A1 | 9/2016 | Keyngnaert et al. |
| 2016/0379284 A1 | 12/2016 | Alizadeh et al. |
| 2017/0353991 A1 | 12/2017 | Tapia |
| 2018/0013783 A1 | 1/2018 | Anachi |
| 2018/0121808 A1 | 5/2018 | Ramakrishna et al. |
| 2018/0150739 A1 | 5/2018 | Wu |
| 2018/0189739 A1 | 7/2018 | Kenthapadi et al. |
| 2018/0253780 A1 | 9/2018 | Wang et al. |
| 2019/0005024 A1 | 1/2019 | Somech et al. |
| 2019/0087865 A1 | 3/2019 | Loree et al. |
| 2019/0089725 A1 | 3/2019 | Anachi |
| 2019/0122232 A1 | 4/2019 | Leidi et al. |
| 2019/0141058 A1 | 5/2019 | Hassanzadeh et al. |
| 2019/0303798 A1 | 10/2019 | Xie et al. |
| 2020/0012958 A1 | 1/2020 | Natanson et al. |
| 2020/0184017 A1 | 6/2020 | Batra et al. |
| 2020/0258045 A1 | 8/2020 | Knupfer |
| 2020/0259700 A1 | 8/2020 | Bhalla et al. |
| 2020/0259701 A1 | 8/2020 | Povoa |
| 2020/0272994 A1 | 8/2020 | Silveira et al. |
| 2020/0327172 A1 | 10/2020 | Coquard et al. |
| 2020/0334580 A1 | 10/2020 | Sheopuri et al. |
| 2020/0342032 A1 | 10/2020 | Subramaniam et al. |
| 2020/0372823 A1 | 11/2020 | Edwards et al. |
| 2021/0021636 A1 | 1/2021 | Sbandi |
| 2021/0056007 A1 | 2/2021 | Viswanathan et al. |
| 2021/0081819 A1 | 3/2021 | Polleri et al. |
| 2021/0083994 A1 | 3/2021 | Pan et al. |
| 2021/0141862 A1 | 5/2021 | Huang et al. |
| 2021/0232613 A1 | 7/2021 | Raval et al. |
| 2021/0249017 A1* | 8/2021 | Burris .................... G10L 15/18 |
| 2021/0342918 A1* | 11/2021 | Price ................. G06Q 30/0631 |
| 2021/0342946 A1 | 11/2021 | Leise et al. |
| 2021/0349955 A1 | 11/2021 | Megill et al. |
| 2021/0374168 A1 | 12/2021 | Srinivasan et al. |
| 2022/0004479 A1 | 1/2022 | McCawley et al. |
| 2022/0012357 A1 | 1/2022 | Rajeev |
| 2022/0107858 A1 | 4/2022 | Jain et al. |
| 2022/0129261 A1 | 4/2022 | Cabrera et al. |
| 2022/0138161 A1 | 5/2022 | Anjum et al. |
| 2022/0138690 A1 | 5/2022 | Anjum et al. |
| 2022/0156298 A1 | 5/2022 | Mahmoud et al. |
| 2022/0229860 A1 | 7/2022 | Ship et al. |
| 2022/0229978 A1 | 7/2022 | Ship et al. |
| 2022/0244847 A1 | 8/2022 | Margot et al. |
| 2022/0261711 A1 | 8/2022 | Krishna et al. |
| 2022/0270120 A1 | 8/2022 | King |
| 2022/0308943 A1 | 9/2022 | Srinivasan et al. |
| 2022/0358225 A1 | 11/2022 | Gadde et al. |
| 2022/0374483 A1 | 11/2022 | Hunt |
| 2022/0374598 A1 | 11/2022 | Osuala et al. |
| 2022/0400159 A1 | 12/2022 | Chi et al. |
| 2023/0018065 A1 | 1/2023 | Schmitt et al. |
| 2023/0033680 A1 | 2/2023 | Whatley |
| 2023/0080589 A1* | 3/2023 | Gupta ................. G06F 16/9035 707/722 |
| 2023/0080724 A1 | 3/2023 | Stoops et al. |
| 2023/0092651 A1 | 3/2023 | Joshi et al. |
| 2023/0099424 A1 | 3/2023 | Hawkinson et al. |
| 2023/0110941 A1 | 4/2023 | Makhija et al. |
| 2023/0124948 A1* | 4/2023 | Li ...................... G06Q 30/0641 705/38 |
| 2023/0135162 A1 | 5/2023 | Cohen et al. |
| 2023/0273783 A1 | 8/2023 | Molander et al. |
| 2023/0297887 A1 | 9/2023 | Gurgu et al. |
| 2023/0316141 A1 | 10/2023 | Toporek et al. |
| 2023/0316339 A1 | 10/2023 | Anderson et al. |
| 2023/0367669 A1 | 11/2023 | Tiwari et al. |
| 2023/0386657 A1 | 11/2023 | Pascal et al. |
| 2023/0396568 A1 | 12/2023 | Lutsyshyn |
| 2023/0401387 A1 | 12/2023 | Alexander et al. |
| 2023/0401660 A1 | 12/2023 | Ambrosch et al. |
| 2024/0037343 A1 | 2/2024 | Miller et al. |
| 2024/0061835 A1 | 2/2024 | Subramanian et al. |
| 2024/0144372 A1 | 5/2024 | Wu et al. |
| 2024/0169163 A1 | 5/2024 | Nguyen |
| 2024/0171480 A1 | 5/2024 | Sheoran et al. |
| 2024/0194180 A1 | 6/2024 | Goldshtein et al. |
| 2024/0202571 A1 | 6/2024 | Yaghi et al. |
| 2024/0202572 A1 | 6/2024 | Morales et al. |
| 2024/0211799 A1 | 6/2024 | Mazor |
| 2024/0249318 A1 | 7/2024 | Spiegel et al. |
| 2024/0267243 A1 | 8/2024 | Ning et al. |
| 2024/0267344 A1 | 8/2024 | Mulligan et al. |
| 2024/0281677 A1 | 8/2024 | Mifflin |
| 2024/0281706 A1 | 8/2024 | Marzinzik et al. |
| 2024/0283697 A1 | 8/2024 | Bates-Maricle |
| 2024/0289113 A1 | 8/2024 | Bates-Maricle |
| 2024/0289872 A1 | 8/2024 | Fields et al. |
| 2024/0291777 A1 | 8/2024 | Fields et al. |
| 2024/0291778 A1* | 8/2024 | Fields ................. G06Q 50/188 |
| 2024/0291779 A1 | 8/2024 | Catalano et al. |
| 2024/0291785 A1 | 8/2024 | Fields et al. |
| 2024/0311618 A1 | 9/2024 | Sukhavasi et al. |
| 2024/0330151 A1 | 10/2024 | Williams et al. |
| 2024/0330455 A1 | 10/2024 | Sahu |
| 2024/0330504 A1 | 10/2024 | Williams et al. |
| 2024/0330654 A1 | 10/2024 | Williams et al. |
| 2024/0331043 A1 | 10/2024 | Williams et al. |
| 2024/0333728 A1 | 10/2024 | Williams et al. |
| 2024/0333746 A1 | 10/2024 | Williams et al. |
| 2024/0394503 A1 | 11/2024 | Gutierrez et al. |
| 2024/0394593 A1 | 11/2024 | Gutierrez et al. |
| 2024/0412145 A1 | 12/2024 | Wheeler et al. |
| 2024/0412313 A1 | 12/2024 | Wheeler et al. |
| 2024/0428259 A1 | 12/2024 | Wheeler et al. |
| 2025/0022071 A1 | 1/2025 | Gutierrez et al. |
| 2025/0029192 A1 | 1/2025 | Wheeler et al. |

FOREIGN PATENT DOCUMENTS

| | | |
|---|---|---|
| JP | 2019-514117 A | 5/2019 |
| KR | 10-2023-0018065 A | 2/2023 |
| KR | 10-2619905 B1 | 1/2024 |
| WO | 2020/198392 A1 | 10/2020 |

(56) References Cited

FOREIGN PATENT DOCUMENTS

| WO | 2021/092164 A1 | 5/2021 |
| WO | 2024/112887 A1 | 5/2024 |

OTHER PUBLICATIONS

Unknown, "GPT-3 vs GPT-4 | What's the difference?", Jan. 2023, botpress.com, web.archive.org/web/20230131033431/https://botpress.com/blog/gpt-3-vs-gpt-4-whats-the-difference (Year: 2023).

Anonymous, Roots Automation Introduces InsurGPT—the World's Most Advanced Generative AI Model for Insurance. Retrieved from the Internet at: https://ffnews.com/newsarticle/roots-automation-introduces-insurgpt-the-worlds-most-advanced-generative-ai-model-for-insurance/ (published May 15, 2023).

Introducing Agent M—a powerful Large Language model or ChatGPT based Master Agent developer framework, powered by Floatbot platform, that lets you create multiple application—specific LLM-based Agent(s). Retrieved from the internet at: <URL:https://www.linkedin.com/posts/jimmypadia_nyse-floor-talk-floatbot-activity-7089664064603234304-60TU?utm_source=share&utm_medium=member_android> (2023).

Isenberg, The Compliance Tasks ChatGPT Can (and Can't) Handle, Ignites (published Apr. 3, 2023).

Morelli, Will ChatGPT, artificial intelligence replace financial professionals any time soon?, Insurance NewsNet. Retrieved from the Internet at: <https://insurancenewsnet.com/innarticle/will-chatgpt-artificial-intelligence-replace-financial-professionals-any-time-soon> (published Jan. 23, 2023).

Morris, Morgan Stanley Developing Chatbot with OpenAI, Ignites (published Mar. 15, 2023).

Munk, Will AI models like ChatGPT take your insurance job?, Life Annuity Speciality (published Mar. 7, 2023).

Rengachary et al., ChatGPT: A Conversation About Underwriting and Life Insurance. Retrieved from the internet at: https://www.coverager.com/chatgpt-a-conversation-about-underwriting-and-life-insurance/ (published Apr. 3, 2023).

Smith, Insurer Zurich experiments with ChatGPT for claims and data mining, Financial Times (published Mar. 24, 2023).

Tuohy, What ChatGPT's Chores May Look Like in Life Insurance Industry, Life Annuity Specialist (published Apr. 21, 2023).

Wilson, Should Financial Services Companies Consider Open AI?, LIMRA.com MarketFacts (published Mar. 2023).

Dickson, How to create a private ChatGPT that interacts with your local documents, TechTalks. Retrieved from the Internet at: <URL:https://bdtechtalks.com/2023/06/01/create-privategpt-local-llm/> (Jun. 2023).

OpenPR Worldwide Public Relations, Press release, "Floatbot.AI Unveils Revolutionary Agent M—Generative AI (LLM or ChatGPT) Based Master Agent developer framework," Web page downloaded from Internet at <https://www.openpr.com/news/3147235/floatbot-ai-unveils-revolutionary-agent-m-generative-ai-llm>. Retrieved from Internet on Aug. 1, 2023.

Bodea, Constanta-Nicoleta, Maria-Iuliana Dascalu, and Alexandru Hang. "Chatbot-based training for project management: . . . " Research on project, programme and portfolio management: Integrating sustainability into project management. Springer International Publishing, 2021. (Year: 2021).

Casillo, Mario, et al. "Chatbot in industry 4.0: An approach for training new employees." 2020 IEEE International Conference on Teaching, Assessment, and Learning for Engineering (TALE). IEEE, 2020. (Year: 2020).

Clarizia, Fabio, et al. "E-learning and industry 4.0: A chatbot for training employees." Proceedings of Fifth International Congress on Information and Communication Technology: ICICT 2020, London, vol. 2. Springer Singapore, 2021. (Year: 2021).

Dovetail Software. "The Ultimate Guide to Conversational AI Chatbots for HR." Dovetail Software Blog, Mar. 12, 2022 (last accessed on Jul. 8, 2025 at https://blog.dovetailsoftware.com/hr/ultimate-guide-to-ai-chatbots-for-hr). (Year: 2022).

English language translation of above-mentioned CN Pat. App. Pub. No. 110175229 A to Chen et al. (Year: 2019).

Grensing-Pophal, Lin. "How HR Is Using Virtual Chat and Chatbots." SHRM News, May 24, 2022 (last accessed on Jul. 8, 2025 at https://www.shrm.org/topics-tools/news/technology/how-hr-using-virtual-chat-chatbots). (Year: 2022).

Suresh, Nalina, et al. "Career counseling chatbot on Facebook messenger using AI." Proceedings of the International Conference on Data Science, Machine Learning and Artificial Intelligence. 2021. (Year: 2021).

JP 2019514117A (Machine translation); 2025 (Year: 2025).

Nguyen et al., "Deep Learning and Handheld Augmented Reality Based System for Optimal Data Collection in Fault Diagnostics Domain." arXiv preprint arXiv:2206.07772 (2022). (Year: 2022).

Shao, "Communication Fault Diagnosis Algorithm Based on BP Neural Network" 2021 3rd International Conference on 3 Intelligent Control, Measurement and Signal Processing and Intelligent Oil Field (ICMSP), Xi'an, China, 2021, pp. 239-243, doi: 10.1109/ICMSP53480.2021.9513359. (Year: 2021).

\* cited by examiner

CHATBOT TO ASSIST IN VEHICLE SHOPPING

CROSS-REFERENCE TO RELATED APPLICATIONS

This application claims priority to and the benefit of the filing date of provisional U.S. Patent Application No. 63/525,755 entitled "CHATBOT TO ASSIST IN VEHICLE SHOPPING," filed on Jul. 10, 2023, provisional U.S. Patent Application No. 63/452,014 entitled "AI CAR SHOPPING," filed on Mar. 14, 2023, and provisional U.S. Patent Application No. 63/449,691 entitled "AI CAR SHOPPING," filed on Mar. 3, 2023, the entire contents of which are hereby expressly incorporated herein by reference.

TECHNICAL FIELD

The present disclosure generally relates to artificial intelligence systems and methods using machine learning techniques for a user purchasing a vehicle, and more particularly, a machine learning chatbot making a purchase recommendation based upon the size, trim level, model year, performance, and/or the total cost of the vehicle for the life of the vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Typically, a purchase of a vehicle (e.g., a car) may involve a purchaser doing considerable research on a make, model, and year of vehicle that is to be purchased. It may involve visiting a number of vehicle dealerships, and/or going to a number of websites to conduct the research. All of which may take considerable time and energy. An important aspect may be the price, maintenance and total cost to own the vehicle whether a new or old vehicle is being purchased. Conventional techniques may include additional inefficiencies, encumbrances, ineffectiveness, and/or other drawbacks.

SUMMARY

With the present embodiments, a computing device may, inter alia, be configured to implement a chatbot or voicebot using machine learning (ML), such that a computing device "learns" to analyze, organize, and/or process data information about multiple vehicle makes and models without being explicitly programmed. A chatbot or voicebot may similarly be implement using artificial intelligence (AI), in addition to or as an alternative to ML methods and algorithms. In response to a customer's inquiry about a vehicle, the AI or ML chatbot or voicebot may recommend useful information to the customer, such as the total cost of ownership of the vehicle, thereby providing the customer the ability to make a more informed purchasing decision.

One exemplary aspect of the present disclosure may be a computer-implemented method for generating recommendations regarding a vehicle purchase. The computer-implemented method may be implemented by one or more local or remote processors, severs, sensors, memory units, mobile devices, wearables, smart glasses, smart watches, augmented reality glasses, virtual reality headsets, extended or mixed reality headsets or glasses, digital assistant devices, smart home systems, chatbots, voicebots, ChatGPT bots, and/or other electronic or electrical components, which may be in wired or wireless communication with one another. For example, in accordance with such aspect, the computer-implemented method may comprise: (1) obtaining, via an AI or ML chatbot or voicebot implemented by one or more processors, customer input indicating an interest in purchasing a vehicle; (2) determining, via the chatbot or voicebot, information about a type of the vehicle based upon the customer input; (3) determining, via the chatbot or voicebot, a total cost of ownership of the vehicle based upon the type of the vehicle; and/or (4) presenting, via the chatbot or voicebot, the total cost of ownership of the vehicle to the customer, such as presenting audible or verbal total cost, and/or displaying a total cost on a display or other screen. The method may include additional, less, or alternate actions, including those discussed elsewhere herein.

The chatbot or voicebot may include one or more of a generative chatbot model, a deep learning algorithm, a generative pre-trained transformer (GPT), and/or a long short-term memory (LSTM) network. The chatbot or voicebot may obtain the customer input in various forms, such as text or audio data. In some exemplary implementations in which a chatbot receives text as part or all of the customer input, the chatbot may apply a natural language processing (NLP) algorithm to the text to generate a word or phrase. The generated word or phrase may be used, for example, to update the customer input to include customer personal information based upon the word or phrase or to determine a vehicle make, a vehicle model, and/or a year of vehicle manufacture based upon the word or phrase as at least part of the information about the type of the vehicle. In further exemplary implementations in which a voicebot receives audio data as part or all of the customer input, the voicebot may apply an audio recognition algorithm to the audio data to generate text and apply an NLP algorithm to the text to generate a word or phrase. The generated word or phrase may be used, for example, to update the customer input to include customer personal information based upon the word or phrase or to determine a vehicle make, a vehicle model, and/or a year of vehicle manufacture based upon the word or phrase as at least part of the information about the type of the vehicle.

Determining the information about the vehicle may comprise determining one or more of the following: a vehicle make, a vehicle model, a vehicle year of manufacture, a number of miles, a number of accidents, any body damage to the vehicle, any interior damage to the vehicle, any accessories installed in the vehicle, special vehicle features, and/or any after-market components installed on the vehicle.

The total cost of ownership may include current and future costs associated with purchasing, maintaining, and insuring the vehicle. For example, the total cost of ownership of the vehicle may include: (i) a cost of an initial vehicle purchase, (ii) taxes for the initial vehicle purchase, (iii) yearly taxes, (iv) yearly maintenance costs, (v) yearly fuel or electricity costs, (vi) yearly insurance premium costs, and/or (vii) a loan cost (including interest on a loan). In some exemplary implementations, the yearly insurance premium costs may be determined, via the chatbot or voicebot, based upon the type of the vehicle, a number of miles driven per year, a total number of accidents for the vehicle resulting in insurance claims, a number of speeding tickets, and/or customer personal information. In further implementations, the yearly insurance premium costs may further be determined, via the chatbot or voicebot, based upon a good student discount, a multi-vehicle discount, and/or a discount for bundling vehicle and home insurance policies.

Systems or computer-readable media storing instructions for implementing all or part of the methods described above may also be provided in some exemplary aspects. Systems for implementing such methods may include one or more processors and one or more memories storing non-transitory computer-executable instructions that, when executed by the one or more processors, cause the one or more processors to implement part or all of the methods described above or elsewhere herein. Such program memories may store instructions to cause the one or more processors to implement part or all of the methods described above or elsewhere herein. The methods, systems, or computer-readable media may include additional, less, or alternate functionality, including those discussed elsewhere herein.

BRIEF DESCRIPTION OF THE DRAWINGS

The Figures described below depict various aspects of the systems and methods disclosed herein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The computer systems and methods disclosed herein generally relate to, inter alia, methods and systems using an artificial intelligence (AI) or machine learning (ML) chatbot or voicebot to communicate with a customer who may be interested in purchasing a vehicle in order to provide useful information to the customer, such as the total cost of ownership of the vehicle.

Some embodiments may use techniques to initiate a session between an AI or ML chatbot or voicebot and a user device (e.g., a computing device such as a laptop, mobile phone, tablet, digital assistant, smart speaker, etc.) to obtain information about the total cost of ownership of a vehicle, which may include: a vehicle make, a vehicle model, a vehicle year of manufacture, a number of miles, a number of accidents, any damage to the body of the vehicle, any interior damage to the vehicle, any accessories installed in the vehicle, special vehicle features, and any after-market components installed on the vehicle. Information may also include the cost of the initial vehicle purchase, taxes paid for the initial vehicle purchase, yearly taxes paid, yearly maintenance costs, yearly fuel costs, yearly insurance premium costs, and/or a loan cost (including interest on the loan). The AI or ML chatbot or voicebot may analyze information from one or more sessions and provide to the user the total cost of vehicle ownership.

Although in the preferred embodiment the vehicle may be a car, truck, or other automobile, the present embodiments may also be utilized with other types of vehicles, such as bicycles, motorcycles, airplanes, boats, autonomous or electric vehicles, flying vehicles, RVs, etc.

Exemplary Computing Environment

Figure 1:
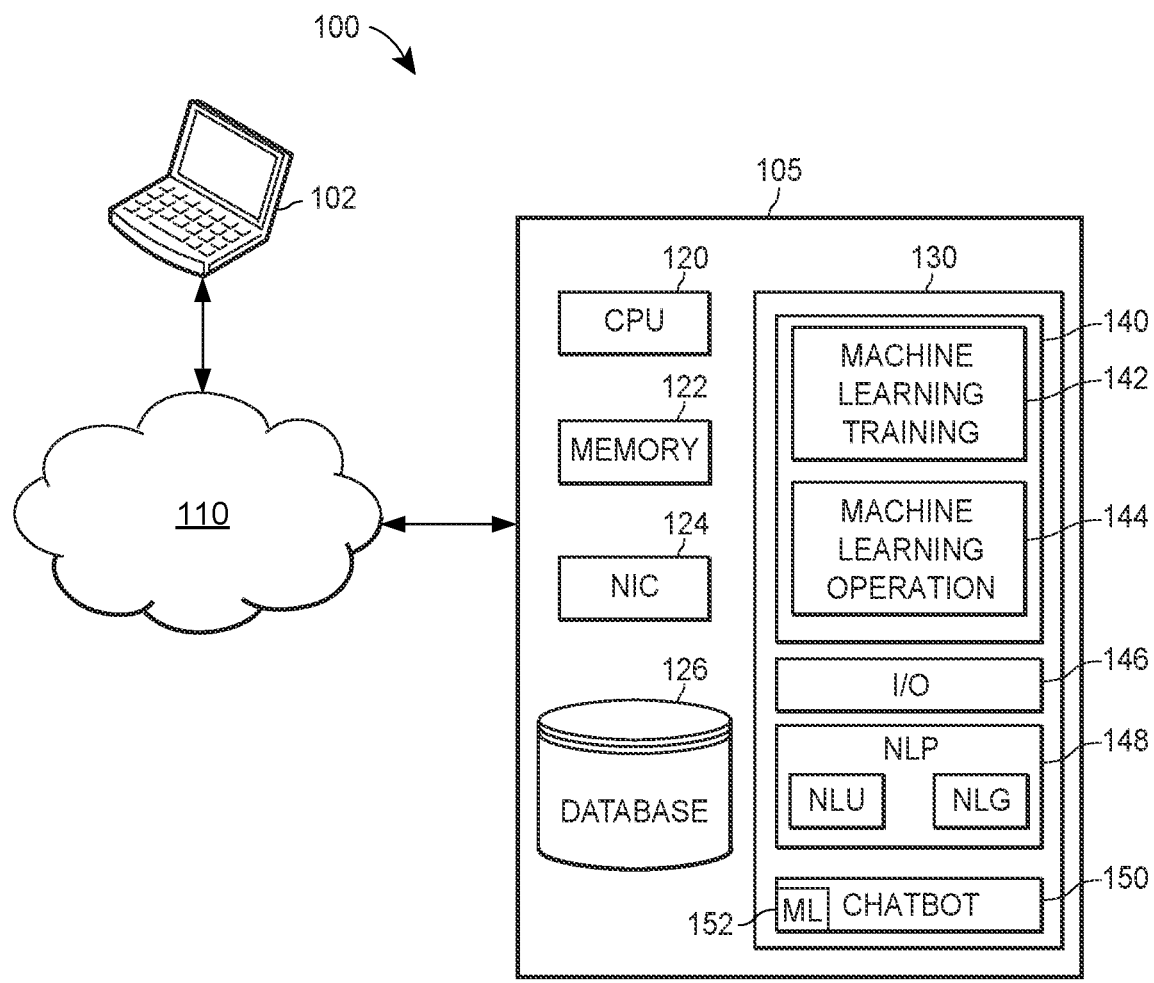
FIG. 1 depicts a block diagram of an exemplary computer system in which methods and systems for generating recommendations regarding a vehicle purchase using an artificial intelligence (AI) or machine learning (ML) chatbot or voicebot may be implemented, according to one embodiment.

FIG. 1 depicts an exemplary computing environment 100 in which an AI or ML chatbot or voicebot configured to communicate with a customer purchasing a vehicle may be implemented, in accordance with various aspects discussed herein.

In the exemplary aspect of FIG. 1, the computing environment 100 includes a user device 102. In various aspects, the user device 102 comprises one or more computers, which may comprise multiple, redundant, or replicated client computers accessed by one or more users. The computing environment 100 may further include an electronic network 110 communicatively coupling other aspects of the computing environment 100.

The user device 102 may be any suitable device and include one or more mobile devices, wearables, smart watches, smart contact lenses, smart glasses, augmented reality glasses, virtual reality headsets, mixed or extended reality glasses or headsets, voicebots or chatbots 150, ChatGPT bots, and/or other electronic or electrical component. The user device 102 may include a memory and a processor for, respectively, storing and executing one or more modules. The memory may include one or more suitable storage media such as a magnetic storage device, a solid-state drive, random access memory (RAM), etc. The user device 102 may access services or other components of the computing environment 100 via the network 110.

As described herein and in one aspect, one or more servers 105 may perform the functionalities as part of a cloud network or may otherwise communicate with other hardware or software components within one or more cloud computing environments to send, retrieve, or otherwise analyze data or information described herein. For example, in certain aspects of the present techniques, the computing environment 100 may comprise an on-premise computing environment, a multi-cloud computing environment, a public cloud computing environment, a private cloud computing environment, and/or a hybrid cloud computing environment. For example, any entity (e.g., a business) offering the intelligent onboarding system may host one or more services in a public cloud computing environment (e.g., Alibaba Cloud, Amazon Web Services (AWS), Google Cloud, IBM Cloud, Microsoft Azure, etc.). The public cloud computing environment may be a traditional off-premise cloud (i.e., not physically hosted at a location owned/controlled by the business). Alternatively, or in addition, aspects of the public cloud may be hosted on-premise at a location owned/controlled by an enterprise receiving the user inquiry regarding total vehicle ownership. The public cloud may be partitioned using visualization and multi-tenancy techniques and may include one or more infrastructure-as-a-service (IaaS) and/or platform-as-a-service (PaaS) services.

The network 110 may comprise any suitable network or networks, including a local area network (LAN), wide area network (WAN), Internet, or combination thereof. For example, the network 110 may include a wireless cellular service (e.g., 4G, 5G, etc.). Generally, the network 110 enables bidirectional communication between the user device 102 and the servers 105. In one aspect, network 110 may comprise a cellular base station, such as cell tower(s), communicating to the one or more components of the computing environment 100 via wired/wireless communications based upon any one or more of various mobile phone standards, including NMT, GSM, CDMA, UMMTS, LTE, 5G, or the like. Additionally or alternatively, network 110 may comprise one or more routers, wireless switches, or other such wireless connection points communicating to the components of the computing environment 100 via wireless communications based upon any one or more of various wireless standards, including by non-limiting example, IEEE 802.11a/b/c/g (WIFI), Bluetooth, and/or the like.

The processor 120 may include one or more suitable processors (e.g., central processing units (CPUs) and/or graphics processing units (GPUs)). The processor 120 may be connected to the memory 122 via a computer bus (not depicted) responsible for transmitting electronic data, data packets, or otherwise electronic signals to and from the processor 120 and memory 122 in order to implement or perform the machine-readable instructions, methods, processes, elements or limitations, as illustrated, depicted, or described for the various flowcharts, illustrations, diagrams, figures, and/or other disclosure herein. The processor 120 may interface with the memory 122 via a computer bus to execute an operating system (OS) and/or computing instructions contained therein, and/or to access other services/aspects. For example, the processor 120 may interface with the memory 122 via the computer bus to create, read, update, delete, or otherwise access or interact with the data stored in the memory 122 and/or a database 126.

The memory 122 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 122 may store an operating system (OS) (e.g., Microsoft Windows, Linux, UNIX, etc.) capable of facilitating the functionalities, apps, methods, or other software as discussed herein.

The memory 122 may store a plurality of computing modules 130, implemented as respective sets of computer-executable instructions (e.g., one or more source code libraries, trained ML models such as neural networks, convolutional neural networks, etc.) as described herein.

In general, a computer program or computer based product, application, or code (e.g., the model(s), such as ML models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 120 (e.g., working in connection with the respective operating system in memory 122) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

The database 126 may be a relational database, such as Oracle, DB2, MySQL, a NoSQL based database, such as MongoDB, or another suitable database. The database 126 may store data and be used to train and/or operate one or more ML/AI models, chatbots 150, and/or voicebots.

In one aspect, the computing modules 130 may include an ML module 140. The ML module 140 may include ML training module (MLTM) 142 and/or ML operation module (MLOM) 144. In some embodiments, at least one of a plurality of ML methods and algorithms may be applied by the ML module 140, which may include, but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of ML, such as supervised learning, unsupervised learning, and reinforcement learning.

In one aspect, the ML based algorithms may be included as a library or package executed on server(s) 105. For example, libraries may include the TensorFlow based library, the PyTorch library, and/or the scikit-learn Python library.

In one embodiment, the ML module 140 employs supervised learning, which involves identifying patterns in existing data to make predictions about subsequently received data. Specifically, the ML module is "trained" (e.g., via MLTM 142) using training data, which includes example inputs and associated example outputs. Based upon the training data, the ML module 140 may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiments, a processing element may be trained by providing it with a large sample of data with known characteristics or features.

In another embodiment, the ML module 140 may employ unsupervised learning, which involves finding meaningful relationships in unorganized data. Unlike supervised learning, unsupervised learning does not involve user-initiated training based upon example inputs with associated outputs. Rather, in unsupervised learning, the ML module 140 may organize unlabeled data according to a relationship determined by at least one ML method/algorithm employed by the ML module 140. Unorganized data may include any combination of data inputs and/or ML outputs as described above.

In yet another embodiment, the ML module 140 may employ reinforcement learning, which involves optimizing outputs based upon feedback from a reward signal. Specifically, the ML module 140 may receive a user-defined reward signal definition, receive a data input, utilize a decision-making model to generate the ML output based upon the data input, receive a reward signal based upon the reward signal definition and the ML output, and alter the decision-making model so as to receive a stronger reward signal for subsequently generated ML outputs. Other types of ML may also be employed, including deep or combined learning techniques.

The MLTM 142 may receive labeled data at an input layer of a model having a networked layer architecture (e.g., an artificial neural network, a convolutional neural network, etc.) for training the one or more ML models. The received data may be propagated through one or more connected deep layers of the ML model to establish weights of one or more nodes, or neurons, of the respective layers. Initially, the weights may be initialized to random values, and one or more suitable activation functions may be chosen for the training process. The present techniques may include training a respective output layer of the one or more ML models. The output layer may be trained to output a prediction, for example.

The MLOM 144 may comprising a set of computer-executable instructions implementing ML loading, configuration, initialization and/or operation functionality. The MLOM 144 may include instructions for storing trained models (e.g., in the electronic database 126). As discussed, once trained, the one or more trained ML models may be operated in inference mode, whereupon when provided with de novo input that the model has not previously been provided, the model may output one or more predictions, classifications, etc., as described herein.

In one aspect, the computing modules 130 may include an input/output (I/O) module 146, comprising a set of computer-executable instructions implementing communication functions. The I/O module 146 may include a communication component configured to communicate (e.g., send and receive) data via one or more external/network port(s) to one or more networks or local terminals, such as computer network 110 and/or the user device 102 (for rendering or visualizing) described herein. In one aspect, servers 105 may include a client-server platform technology such as ASP-.NET, Java J2EE, Ruby on Rails, Node.js, a web service or online API, responsive for receiving and responding to electronic requests.

I/O module 146 may further include or implement an operator interface configured to present information to an administrator or operator and/or receive inputs from the administrator and/or operator. An operator interface may provide a display screen. I/O module 146 may facilitate I/O components (e.g., ports, capacitive or resistive touch sensitive input panels, keys, buttons, lights, LEDs), which may be directly accessible via, or attached to, servers 105 or may be indirectly accessible via or attached to the user device 102. According to an aspect, an administrator or operator may access the servers 105 via the user device 102 to review information, make changes, input training data, initiate training via the MLTM 142, and/or perform other functions (e.g., operation of one or more trained models via the MLOM 144).

In one aspect, the computing modules 130 may include one or more NLP modules 148 comprising a set of computer-executable instructions implementing NLP, natural language understanding (NLU) and/or natural language generator (NLG) functionality. The NLP module 148 may be responsible for transforming the user input (e.g., unstructured conversational input such as speech or text) to an interpretable format. The NLP module may include NLU processing to understand the intended meaning of utterances, among other things. The NLP module 148 may include NLG which may provide text summarization, machine translation, and dialog where structured data is transformed into natural conversational language (i.e., unstructured) for output to the user.

In one aspect, the computing modules 130 may include one or more chatbots and/or voicebots 150 which may be programmed to simulate human conversation, interact with users, understand their needs, and recommend an appropriate line of action with minimal and/or no human intervention, among other things. This may include providing the best response of any query that it receives and/or asking follow-up questions.

In some embodiments, the voicebots or chatbots 150 discussed herein may be configured to utilize AI and/or ML techniques. The AI chatbot includes at least one of a generative AI chatbot model, a deep learning algorithm, a generative pre-trained transformer (GPT), and a long short-term memory (LSTM) network. For instance, the voicebot or chatbot 150 may be a ChatGPT chatbot.

The voicebot or chatbot 150 may employ supervised or unsupervised machine learning techniques, which may be followed by, and/or used in conjunction with, reinforced or reinforcement learning techniques. The voicebot or chatbot 150 may employ the techniques utilized for ChatGPT.

Noted above, in some embodiments, a chatbot 150 or other computing device may be configured to implement ML, such that server 105 "learns" to analyze, organize, and/or process data without being explicitly programmed. ML may be implemented through ML methods and algorithms ("ML methods and algorithms"). In one exemplary embodiment, the ML module 140 may be configured to implement ML methods and algorithms.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the ML module employs supervised learning, which involves identifying patterns in existing data to make predictions about subsequently received data. Specifically, the ML module is "trained" using training data, which includes example inputs and associated example outputs. Based upon the training data, the ML module may generate a predictive function which maps outputs to inputs and may utilize the predictive function to generate ML outputs based upon data inputs. The exemplary inputs and exemplary outputs of the training data may include any of the data inputs or ML outputs described above. In one exemplary embodiment, a processing element may be trained by providing it with a large sample of data with known characteristics or features.

In another embodiment, an ML module may employ unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above.

In yet another embodiment, an ML module may employ reinforcement learning, which involves optimizing outputs based upon feedback from a reward signal. Specifically, the ML module may receive a user-defined reward signal definition, receive a data input, utilize a decision-making model to generate an ML output based upon the data input, receive a reward signal based upon the reward signal definition and the ML output, and alter the decision-making model to receive a stronger reward signal for subsequently generated ML outputs. Other types of machine learning may also be employed, including deep or combined learning techniques.

For example, in one aspect, the server 105 may initiate a chat session over the network 110 with a user via a user device 102, e.g., the user may request the total cost of ownership of a vehicle having a particular make, model, trim, and year. The chatbot 150 may receive utterances from the user, i.e., the input from the user from which the chatbot 150 needs to derive intents. The utterances may be processed using NLP module 148 and/or ML module 140 via one or more ML models to recognize what the user says, understand the meaning, determine the appropriate action, and/or respond with language the user can understand.

In one aspect, the server 105 may host and/or provide an application (e.g., a mobile application) and/or website configured to provide the application to receive claim information, such as first notice of loss ("FNOL") information, from a user. In an aspect, the server 105 may store code in memory 122 which when executed by CPU 120 may provide the website and/or application.

In another aspect, the application may use the chatbot 150 to guide the user through a step-by-step question and answer process until the FNOL or other claim information has been captured by the server 105. In one aspect, the server 105 may store the FNOL or other claim information in the database 126. The data may be cleaned, labeled, vectorized, weighted and/or otherwise processed, especially processing suitable for data used in any aspect of ML.

In a further aspect, anytime the server 105 evaluates the FNOL or other claim information, the associated information may be stored in the database 126. In one aspect, the server 105 may use the stored data to generate, train and/or retrain one or more ML models and/or chatbots 150, and/or for any other suitable purpose.

In operation, ML model training module 142 may access database 126 or any other data source for training data suitable to generate one or more ML models appropriate to receive and/or process the FNOL or other claim information, e.g., an ML chatbot 152. The training data may be sample data with assigned relevant and comprehensive labels (classes or tags) used to fit the parameters (weights) of an ML model with the goal of training it by example. In an aspect, training data may include historical data from past first notices of loss. The historical data may include the make, model, trim, year of vehicle in addition to purchase price, maintenance costs, taxes, insurance, as well as any other suitable training data. In one aspect, once an appropriate ML model is trained and validated to provide accurate predictions and/or responses, e.g., the ML chatbot 152 generated by MLTM 142, the trained model and/or ML chatbot 152 may be loaded into MLOM 144 at runtime, may process the user inputs and/or utterances, and may generate as an output conversational dialog.

While various embodiments, examples, and/or aspects disclosed herein may include training and generating one or more ML models and/or ML chatbot 152 for the server 105 to load at runtime, it is also contemplated that one or more appropriately trained ML models and/or ML chatbot 152 may already exist (e.g., in database 126) such that the server 105 may load an existing trained ML model and/or ML chatbot 152 at runtime. It is further contemplated that the server 105 may retrain, update and/or otherwise alter an existing ML model and/or ML chatbot 152 before loading the model at runtime.

Although the computing environment 100 is shown to include one user device 102, one server 105, and one network 110, it should be understood that different numbers of user devices 102, networks 110, and/or servers 105 may be utilized. In one example, the computing environment 100 may include a plurality of servers 105 and hundreds or thousands of user devices 102, all of which may be interconnected via the network 110. Furthermore, the database storage or processing performed by the one or more servers 105 may be distributed among a plurality of servers 105 in an arrangement known as "cloud computing." This configuration may provide various advantages, such as enabling near real-time uploads and downloads of information as well as periodic uploads and downloads of information.

The computing environment 100 may include additional, fewer, and/or alternate components, and may be configured to perform additional, fewer, or alternate actions, including components/actions described herein. Although the computing environment 100 is shown in FIG. 1 as including one instance of various components such as user device 102, server 105, and network 110, etc., various aspects include the computing environment 100 implementing any suitable number of any of the components shown in FIG. 1 and/or omitting any suitable ones of the components shown in FIG. 1. For instance, information described as being stored at server database 126 may be stored at memory 122, and thus database 126 may be omitted. Moreover, various aspects include the computing environment 100 including any suitable additional component(s) not shown in FIG. 1, such as but not limited to the exemplary components described above. Furthermore, it should be appreciated that additional and/or alternative connections between components shown in FIG. 1 may be implemented. As just one example, server 105 and user device 102 may be connected via a direct communication link (not shown in FIG. 1) instead of, or in addition to, via network 110.

Exemplary Computer System for Recommending Purchasing a Vehicle

An exemplary computer system for recommending purchasing a vehicle using an artificial intelligence (AI) chatbot or machine learning (ML) voicebot using the ML chatbot 152 may include the user device 102, the network 110, and/or the server 105. The system may include additional, less, or alternate devices, including those discussed elsewhere herein.

In one aspect, a customer wants to purchase a vehicle, the vehicle may be new or may be used. The customer may use their user device 102 (e.g., a mobile phone, a laptop, a tablet, etc.) to communicate with an artificial intelligence (AI) chatbot or machine learning (ML) voicebot using a mobile application (e.g., app). The user may sign into the application using their user credentials. Information from the user credentials may be transmitted by the user device 102 via network 110 to an enterprise server 105. The server 105 may verify the user credentials, and the app may initiate a session with an artificial intelligence (AI) chatbot or machine learning (ML) voicebot (hereinafter chatbot 150) and the user device 102. The session may include one or more of (i) audio (e.g., a telephone call), (ii) text messages (e.g., short messaging/SMS, multimedia messaging/MMS, iPhone iMessages, etc.), (iii) instant messages (e.g., real-time messaging such as a chat window), (iv) video such as video conferencing, (v) communication using virtual reality, (vi) communication using augmented reality, (vii) blockchain entries, (vii) communication in the metaverse, and/or any other suitable form of communication.

The session which the enterprise initiates with the user device 102 may be an interactive session with the chatbot 150. The enterprise server 105, server 105, may generate one or more requests via the chatbot 150 for information about the type of vehicle they want to purchase. The chatbot 150 may be the AI chatbot, the ML chatbot 152 such as a ChatGPT chatbot, voicebot and/or any other suitable chatbot and described herein. The server 105 may select an appropriate chatbot 150 based upon the method of communication with the user. In one example, the server 105 may train (e.g., via ML module 140 and/or MLTM 142) the ML chatbot 152 to determine the total cost of ownership for multiple type of vehicles, trims, and year of manufacture.

In one aspect, the chatbot 150 is the ML chatbot 152. The server 105 may initially use the ML chatbot 152 to obtain information about the care to be purchase from the user at the beginning of a session and continue to use the ML chatbot 152 to request additional information. In one aspect, the ML chatbot 152 may be initiated by the server 105 in response to previously receiving initial information about a vehicle. The server 105 may train (e.g., via ML module 140 and/or MLTM 142) the ML chatbot 152 to communicate with the user in a conversational manner without human intervention from the enterprise. Through the one or more requests, the ML chatbot 152 may receive information about the vehicle to be purchased via the user device 102. This may include, but is not limited to, information about the type of vehicle to be purchased, such as a vehicle make, a vehicle model, a vehicle year of manufacture, a number of miles, a number of accidents, any damage to the body of the vehicle, any interior damage to the vehicle, any accessories installed in the vehicle, special vehicle features, any after-market components installed on the vehicle, the initial purchase price of the vehicle, and the taxes paid for the initial vehicle purchase. During the session, the server 105 may process the information received by the ML chatbot 152 to determine information is needed, and generate additional requests via the ML chatbot 152. For example, additional information, such as the customer's personal information, may be requested by ML chatbot 152 in order to process or understand a loan for the purchase of the vehicle, such information may include the customer personal information comprises a name, a residential address, a phone number, an age, a government identification number, and a place of employment.

After acquiring initial information regarding the purchase of the vehicle, the enterprise, server 105 may obtain additional information from the user via the app including the cost to operate the vehicle, which may include yearly taxes paid, yearly maintenance costs, yearly fuel costs, yearly insurance premium costs, and/or a loan cost (including interest on the loan). Additional information requested by server 105 may include the yearly insurance premium costs based upon the type of vehicle, a number of miles driven per year, a total number of accidents for the vehicle resulting in insurance claims, a number of speeding tickets, a good student discount, a multi-vehicle discount, and a discount for bundling vehicle and home insurance policies.

Upon receiving the information from the user, the server 105 may determine a total cost of ownership of the type of vehicle to be purchased, and transmit via the chatbot 150, the total cost of ownership of the vehicle to be presented a display on user device 102. In an embodiment the total cost of ownership of the vehicle may be presented to the user on the user device 102 via a text message, an audio message, an instant message, an email, a video, a virtual reality, an augmented reality, a blockchain, and a metaverse.

Supervised Fine-Tuning ML Model

Figure 2:
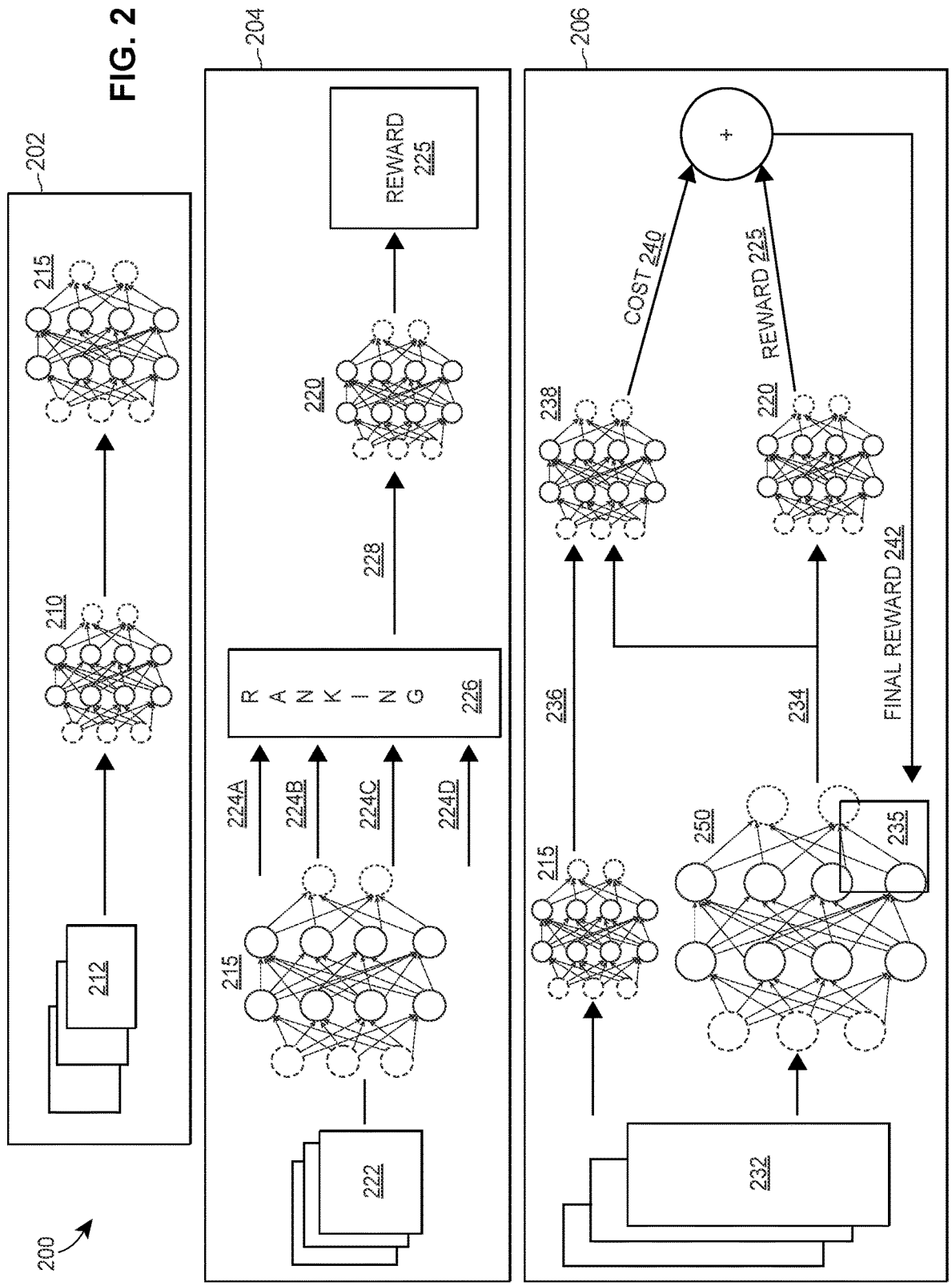
FIG. 2 depicts a combined block and logic diagram in which exemplary computer-implemented methods and systems for training an ML or AI chatbot or model are implemented, in accordance with various embodiments described herein.

FIG. 2 depicts an exemplary combined block and logic diagram 200 for training an ML chatbot model, by which aspects of the techniques described herein may be implemented, according to some embodiments. Some of the blocks in FIG. 2 may represent hardware and/or software components, other blocks may represent data structures or memory storing these data structures, registers, or state variables (e.g., 212), and other blocks may represent output data (e.g., 225). Input and/or output signals may be represented by arrows labeled with corresponding signal names and/or other identifiers. The methods and systems may include one or more servers 202, 204, 206, such as the server 105 of FIG. 1.

In one aspect, the server 202 may fine-tune a pretrained language model 210. The pretrained language model 210 may be obtained by the server 202 and be stored in a memory, such as memory 122 and/or database 126. The pretrained language model 210 may be loaded into an ML training module, such as MLTM 142, by the server 202 for retraining/fine-tuning. A supervised training dataset 212 may be used to fine-tune the pretrained language model 210 wherein each data input prompt to the pretrained language model 210 may have a known output response from which the pretrained language model 210 may learn. The supervised training dataset 212 may be stored in a memory of the server 202, e.g., the memory 122 or the database 126. In one aspect, the data labelers may create the prompts and appropriate responses of the supervised training dataset 212. The pretrained language model 210 may be fine-tuned using the supervised training dataset 212 resulting in the SFT ML model 215 which may provide appropriate responses to user prompts once trained. The trained supervised fine-tuning ("SFT") ML model 215 may be stored in a memory of the server 202, e.g., memory 122 and/or database 126.

In one aspect, the supervised training dataset 212 may include prompts and responses which may be relevant to a user requesting a customized insurance policy with their insurance carrier. For example, a user may request a customized insurance policy in view of his recent and/or expected life events. Appropriate responses may include requesting more details about the user's recent and/or expected life events, recommending a customized insurance policy in view of the changes and data associated with the user, among other things.

In one embodiment, the recommended customized insurance policy may include a qualitative or non-quantitative suggestion. For example, the input data "buying a new car" (noted previously, the present embodiments may also apply to buying other types of vehicles in addition to automobiles, such as airplanes, boats, motorcycles, flying vehicles, bicycles, etc.) may be associated with an appropriate response such as "In view of your recent potential purchases of a new vehicle, we recommend increasing your insurance policy coverage." The input data may also be processed to generate intermediate input data. For example, the input data include trading in vehicle A for a new vehicle B. The intermediate input data include the difference between the improved safety features of the new vehicle B compared to vehicle A. An appropriate response may be associated with the improved safety features included in the intermediate input data. The safety feature data associated with vehicle B and vehicle A may be retrieved from the database 126, or retrieved from various databases available on the Internet in real-time.

In another embodiment, the proposed customized insurance policy may include a quantitative suggestion. For example, in response to a user buying a vehicle, the proposed customized insurance policy may be "In view of your recent purchase of a vehicle, we recommend increasing your insurance policy coverage by about 10%." The model may further communicate with a data analysis module. The data analysis module may be included in the chatbot 150 or in the ML module 140. The data analysis module may be trained by supervised learning, unsupervised learning, semi-supervised learning, and may employ any model that fits for data analysis purposes. As such, a medium response may be associated with an instruction which invokes the data analysis module to determine an appropriate customized insurance policy. For example, the input data include the total cost of ownership of the purchased vehicle. An appropriate medium response associated with the input data may include detecting a need for data analysis and causing the data analysis module to perform data analysis. In response to receiving an analysis result from the data analysis module, an appropriate response may be generated by combining a conversational response associated with the prompt (e.g., "In view of your recent vehicle purchase, we determined the total cost of ownership of the vehicle to be approximately $1320 per year, including a recommended increase of about 10% in your insurance policy coverage at an annual cost of about $120.") with an output from the data analysis module (e.g., "increase" and "10%").

In another aspect, the supervised training dataset 212 may include prompts and responses which may be relevant to requesting customized code implementing a customized insurance policy. For example, the server 160 may transmit, via one or more processors 120, a prompt for requesting customized code. An appropriate response associated with the prompt may be customized code consistent with the request.

In one embodiment, the prompt may include existing code implementing a current insurance policy held by the user (i.e., the "target code"). An appropriate response may include customized code consistent with the target code. For example, if the target code is written in Python with a particular function name (e.g., "def policy: code_for_current_policy"), an appropriate response may also be written in Python with the same particular function name (e.g., "def policy: code_for_customized_policy").

In another embodiment, the prompt may include a recommended customized insurance policy. An appropriate response may be customized code implementing the recommended customized insurance policy.

In yet another embodiment, the prompt may include data associated with the user and/or data associated with the user's recent life events. An appropriate intermediate response may include detecting a need for data analysis and causing a data analysis module to perform data analysis. In response to receiving a data analysis result from the data analysis module, an appropriate response may be customized code implementing a customized insurance policy consistent with the data analysis result.

Training the Reward Model

In one aspect, training the ML chatbot model 250 may include the server 204 training a reward model 220 to provide as an output a scaler value/reward 225. The reward model 220 may be required to leverage Reinforcement Learning with Human Feedback ("RLHF") in which a model (e.g., ML chatbot model 250) learns to produce outputs which maximize its reward 225, and in doing so may provide responses which are better aligned to user prompts.

Training the reward model 220 may include the server 204 providing a single prompt 222 to the SFT ML model 215 as an input. The input prompt 222 may be provided via an input device (e.g., a keyboard) via the I/O module of the server, such as I/O module 146. The prompt 222 may be previously unknown to the SFT ML model 215, e.g., the labelers may generate new prompt data, the prompt 222 may include testing data stored on database 126, and/or any other suitable prompt data. The SFT ML model 215 may generate multiple, different output responses 224A, 224B, 224C, 224D to the single prompt 222. The server 204 may output the responses 224A, 224B, 224C, 224D via an I/O module (e.g., I/O module 146) to a user interface device, such as a display (e.g., as text responses), a speaker (e.g., as audio/voice responses), and/or any other suitable manner of output of the responses 224A, 224B, 224C, 224D for review by the data labelers.

The data labelers may provide feedback via the server 204 on the responses 224A, 224B, 224C, 224D when ranking 226 them from best to worst based upon the prompt-response pairs. The data labelers may rank 226 the responses 224A, 224B, 224C, 224D by labeling the associated data. The ranked prompt-response pairs 228 may be used to train the reward model 220. In one aspect, the server 204 may load the reward model 220 via the ML module (e.g., the ML module 140) and train the reward model 220 using the ranked response pairs 228 as input. The reward model 220 may provide as an output the scalar reward 225.

In one aspect, the scalar reward 225 may include a value numerically representing a human preference for the best and/or most expected response to a prompt, i.e., a higher scaler reward value may indicate the user is more likely to prefer that response, and a lower scalar reward may indicate that the user is less likely to prefer that response. For example, inputting the "winning" prompt-response (i.e., input-output) pair data to the reward model 220 may generate a winning reward. Inputting a "losing" prompt-response pair data to the same reward model 220 may generate a losing reward. The reward model 220 and/or scalar reward 225 may be updated based upon labelers ranking 226 additional prompt-response pairs generated in response to additional prompts 222.

In one example, a data labeler may provide to the SFT ML model 215 as an input prompt 222 the phrase "Describe the sky." The input may be provided by the labeler via the user device 102 over network 110 to the server 204 running a chatbot application utilizing the SFT ML model 215. The SFT ML model 215 may provide as output responses to the labeler via the user device 102 the following: (i) "The sky is above." (response 224A); (ii) "The sky includes the atmosphere and may be considered a place between the ground and outer space." (response 224B); (iii) "The sky is heavenly." (response 224C); and (iv) "The sky is blue." (response 224D). The data labeler may rank 226, via labeling the prompt-response pairs, prompt-response pair 222/224B as the most preferred answer; prompt-response pair 222/224A as a less preferred answer; prompt-response pair 222/224D as a less preferred answer; and prompt-response 222/224C as the least preferred answer. The labeler may rank 226 the prompt-response pair data in any suitable manner. The ranked prompt-response pairs 228 may be provided to the reward model 220 to generate the scalar reward 225.

While the reward model 220 may provide the scalar reward 225 as an output, the reward model 220 may not generate a response (e.g., text). Rather, the scalar reward 225 may be used by a version of the SFT ML model 215 to generate more accurate responses to prompts. Thus, the SFT model 215 may generate the response such as text to the prompt, and the reward model 220 may receive the response to generate a scalar reward 225 of how well humans perceive it. Reinforcement learning may optimize the SFT model 215 with respect to the reward model 220 which may realize the configured ML chatbot model 250.

RLHF to Train the ML Chatbot Model

In one aspect, the server 206 may train the ML chatbot model 250 (e.g., via the ML module 140) to generate a response 234 to a random, new and/or previously unknown user prompt 232. To generate the response 234, the ML chatbot model 250 may use a policy 235 (e.g., an algorithm) which it learns during training of the reward model 220, and in doing so may advance from the SFT model 215 to the ML chatbot model 250. The policy 235 may represent a strategy that the ML chatbot model 250 learns to maximize its reward 225. As discussed herein, based upon prompt-response pairs, a human labeler may continuously provide feedback to assist in determining how well the ML chatbot's 250 responses match expected responses to determine rewards 225. The rewards 225 may feed back into the ML chatbot model 250 to evolve the policy 235. Thus, the policy 235 may adjust the parameters of the ML chatbot model 250 based upon the rewards 225 it receives for generating good responses. The policy 235 may update as the ML chatbot model 250 provides responses 234 to additional prompts 232.

In one aspect, the response 234 of the ML chatbot model 250 using the policy 235 based upon the reward 225 may be compared using a cost function 238 to the SFT ML model 215 (which may not use a policy) response 236 of the same prompt 232. The cost function 238 may be trained in a similar manner and/or contemporaneous with the reward model 220. The server 206 may compute a cost 240 based upon the cost function 238 of the responses 234, 236. The cost 240 may reduce the distance between the responses 234, 236, i.e., a statistical distance measuring how one probability distribution is different from a second, in one aspect the response 234 of the ML chatbot model 250 versus the response 236 of the SFT model 215. Using the cost 240 to reduce the distance between the responses 234, 236 may avoid a server over-optimizing the reward model 220 and deviating too drastically from the human-intended/preferred response. Without the cost 240, the ML chatbot model 250 optimizations may result in generating responses 234 which are unreasonable but may still result in the reward model 220 outputting a high reward 225.

In one aspect, the responses 234 of the ML chatbot model 250 using the current policy 235 may be passed by the server 206 to the rewards model 220, which may return the scalar reward 225. The ML chatbot model 250 response 234 may be compared via the cost function 238 to the SFT ML model 215 response 236 by the server 206 to compute the cost 240. The server 206 may generate a final reward 242 which may include the scalar reward 225 offset and/or restricted by the cost 240. The final reward 242 may be provided by the server 206 to the ML chatbot model 250 and may update the policy 235, which in turn may improve the functionality of the ML chatbot model 250.

To optimize the ML chatbot 250 over time, RLHF via the human labeler feedback may continue ranking 226 responses of the ML chatbot model 250 versus outputs of earlier/other versions of the SFT ML model 215, i.e., providing positive or negative rewards 225. The RLHF may allow the servers (e.g., servers 204, 206) to continue iteratively updating the reward model 220 and/or the policy 235. As a result, the ML chatbot model 250 may be retrained and/or fine-tuned based upon the human feedback via the RLHF process, and throughout continuing conversations may become increasingly efficient.

Although multiple servers 202, 204, 206 are depicted in the exemplary block and logic diagram 200, each providing one of the three steps of the overall ML chatbot model 250 training, fewer and/or additional servers may be utilized and/or may provide the one or more steps of the ML chatbot model 250 training. In one aspect, one server may provide the entire ML chatbot model 250 training.

Exemplary Method for Recommending Purchasing a Vehicle

Figure 3:
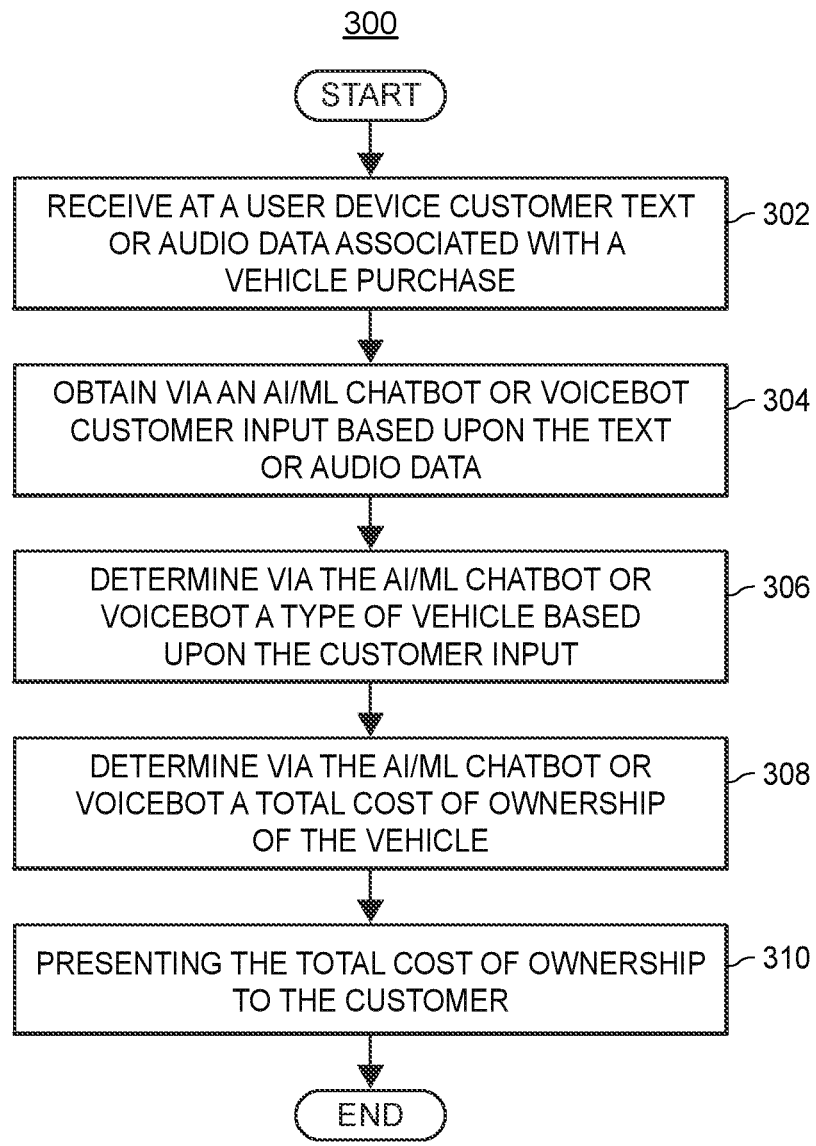
FIG. 3 depicts a flow diagram of an exemplary computer-implemented method for generating recommendations regarding a vehicle purchase using an ML or AI chatbot or voicebot, in accordance with various embodiments described herein.

Turning now to FIG. 3, which depicts a flow diagram of an exemplary computer-implemented method 300 for generating recommendations regarding a vehicle purchase using an ML or AI chatbot or voicebot, according to one embodiment. The AI and ML chatbot or voicebot may include a generative chatbot model, a deep learning algorithm, a generative pre-trained transformer (GPT), and/or a long short-term memory (LSTM) network. One or more aspects of the method 300 may be implemented as a set of instructions stored on a computer-readable memory and executable on one or more processors. The method 300 of may be performed by the server 105. The server 105 may be configured to communicate with the user device 102 via the network 110. One or more steps of the method 300 may be implemented as a set of instructions stored on a computer-readable memory (e.g., memory 122) and executable on one or more processors (e.g., processor 120) of server 105. It should be appreciated that the method 300 is merely exemplary and may include alternative or additional functionalities. Further, method 300 may include additional, alternative, or fewer aspects to those described below, including those described elsewhere herein.

At block 302, the user device 102 may receive text or audio data from a customer, which text or audio data may be associated with a vehicle purchase. The text or audio data received from the customer may indicate an interest in purchasing a vehicle, either directly (e.g., a direct request for information about a specific type of vehicle) or indirectly (e.g., a user request suggesting a user may be considering purchasing a vehicle). Text data may be received from a user interaction with a physical or virtual keyboard or other text input device. Audio data may be received from a microphone or other audio input device and may contain speech of the customer. In some embodiments, the user device 102 may analyze the text or audio data to determine one or more intents of the customer, then pass the text or audio data (and/or data derived therefrom) to an AI or ML chatbot or voicebot based upon identifying an intent of the user relating to a vehicle purchase.

At block 304, the server 105 may obtain customer input via an AI or ML chatbot or voicebot, which customer input may indicate an interest of the customer in purchasing a vehicle. Obtaining the customer input may include receiving the text or audio data from the user device 102. Additional or alternative customer input may be generated by the AI or ML chatbot or voicebot in some embodiments. In an embodiment in which the customer input includes text, the chatbot may apply an NLP algorithm to the received customer input (e.g., to received text) to generate a word or phrase. The chatbot may obtain customer personal information based upon such word or phrase. The chatbot may additionally or alternatively determine information about the type of vehicle to be purchased, which may include determining a vehicle make, a vehicle model, and/or a year of vehicle manufacture based upon the word or phrase. In a further embodiment in which the customer input includes text, the voicebot may apply an audio recognition algorithm to the audio data to generate text, then apply an NLP algorithm to the text to generate a word or phrase. The voicebot may receive customer personal information based upon the word or phrase. The voicebot may further determine information about the type of vehicle to be purchased, which may include determining a vehicle make, a vehicle model, and/or a year of vehicle manufacture based upon the word or phrase.

At block 306, the server 105 may determine, via the AI or ML chatbot or voicebot, information about the type of vehicle based upon the customer input. The information about the vehicle may include specifically identify a particular vehicle (e.g., by vehicle identification number (VIN)) or may generally identify a particular group of vehicles (e.g., vehicles of one or more years of a make and model, which may be further classified based upon characteristics such as mileage or condition). The information about the vehicle may include indications of one or more of the following: a vehicle make, a vehicle model, a vehicle year of manufacture, a number of miles, a number of accidents, any body damage to the vehicle, any interior damage to the vehicle, any accessories installed in the vehicle, special vehicle features, and/or any after-market components installed on the vehicle.

At block 308, the server 105 may determine, via the AI or ML chatbot or voicebot, a total cost of ownership of the type of vehicle to be purchased. The total cost of ownership of the vehicle may include current and future costs associated with purchasing, maintaining, and insuring the vehicle. For example, the total cost of ownership of the vehicle may include one or more of: (i) cost of the initial vehicle purchase, (ii) taxes paid for the initial vehicle purchase, (iii) yearly taxes paid, (iv) yearly maintenance costs, (v) yearly fuel costs, (vi) yearly insurance premium costs, and/or (vii) a loan cost (including interest on the loan). The AI or ML chatbot or voicebot may generate estimates of each current or future costs associated with the vehicle based upon information regarding the type of vehicle (e.g., make, model, and year) and the customer (e.g., based upon the customer's known location, age, driving history, or risk profile or preferences). In some embodiment, the yearly premium costs may be determined by the AI or ML chatbot or voicebot based upon the type of vehicle, a number of miles driven per year, a total number of accidents for the vehicle resulting in insurance claims, a number of speeding tickets, and/or customer personal information. In some such embodiments, the yearly insurance premium costs may further be determined, via the chatbot or voicebot, based upon a good student discount, a multi-vehicle discount, and/or a discount for bundling vehicle and home insurance policies.

At block 310, the server 105 may present the total cost of ownership of the vehicle to the customer via the AI or ML chatbot or voicebot controlling an output component of the user device 102. In order to present the total cost of ownership to the customer, the AI or ML voicebot or chatbot may control (e.g., by messages, commands, calls, or instructions) one or more components of the user device 102 to present an audible or verbal indication of the total cost and/or to display a total cost on a display or other screen. In some embodiments, the AI or ML chatbot or voicebot may generate or provide additional recommendations or resources regarding the total cost of ownership of the vehicle to the customer, such as providing contextual information on the distribution of the costs (e.g., over time or with respect to other vehicles or drivers). Such additional recommendations or resources may include recommendations regarding levels of insurance coverage or warranties for the vehicle.

Exemplary AI and/or ML Techniques

Figure 4:
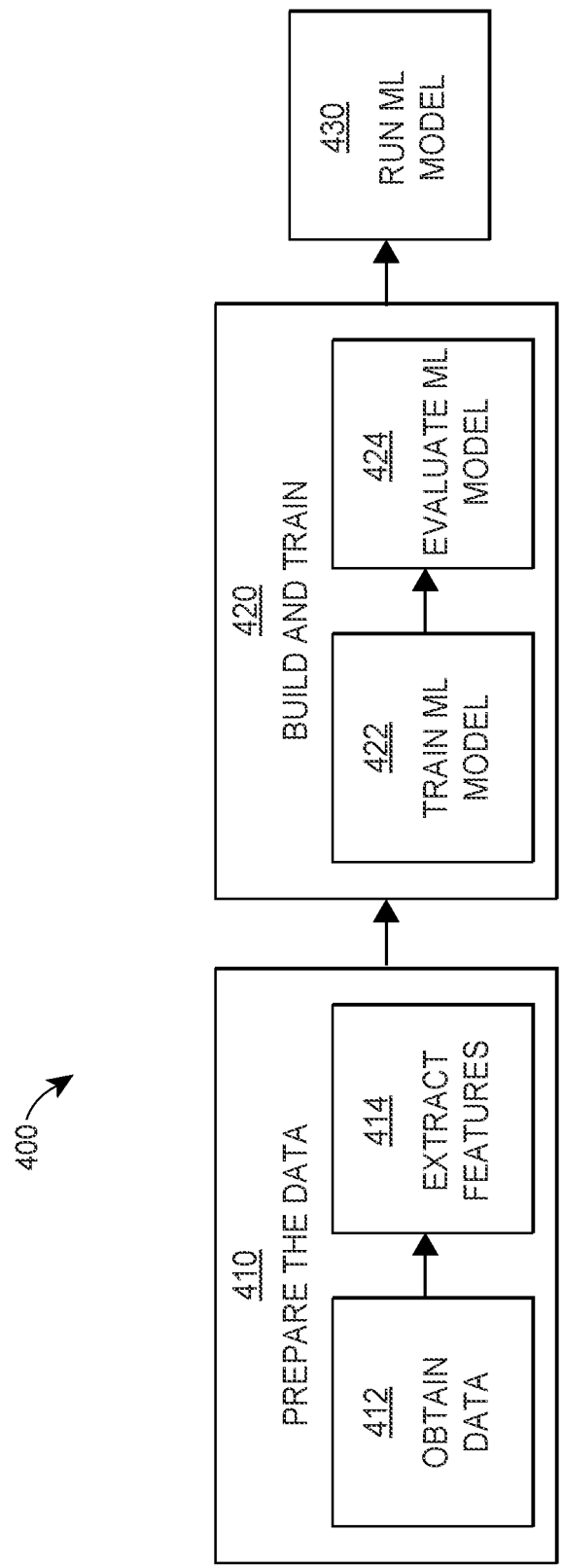
FIG. 4 illustrates a block diagram of an exemplary machine learning modeling method for training and evaluating exemplary machine learning models, in accordance with various embodiments described herein.

FIG. 4 illustrates a block diagram of an exemplary ML modeling method 400 for training and evaluating exemplary machine learning ML algorithm. In some embodiments, the model "learns" an algorithm capable of performing the desired function, such as recommending purchasing a vehicle. Broadly speaking, AI and/or ML algorithms and/or models may be used to determine a recommendation of purchasing a vehicle. It should be understood that the principles of FIG. 4 may apply to any ML or AI algorithm or model discussed herein. Although the following discussion refers to an ML algorithm, it should be appreciated that it applies equally to ML and/or AI algorithms and/or models. Moreover, it should be appreciated the ML algorithm(s) may be any kind of ML algorithms (e.g., neural networks, convolutional neural networks, deep learning algorithms, etc.). Although the following discussion refers to the blocks of FIG. 4 as being performed by the one or more processors 120 of server 105, it should be appreciated that the blocks of FIG. 4 may be performed by any suitable component or combinations of components. Further, method 400 may include additional, alternative, or fewer aspects to those described below, including those described elsewhere herein.

At a high level, the machine learning modeling method 400 includes a block 410 to prepare the data, a block 420 to build and train the model, and a block 430 to run the model. In some embodiments, the ML model may be iteratively trained or retrained over time using additional data or user feedback in order to improve the functioning of the ML model. Additional data or user feedback may be collected directly or inferred from user behavior.

Block 410 may include blocks 412 and 416. At block 412, the server 105 may obtain historical information to train the machine learning algorithm. In some examples, the historical information may include indications of one or more of the following: a vehicle make, a vehicle model, a year of vehicle manufacture, a number of miles, a number of accidents, any body damage to the vehicle, any interior damage to the vehicle, any accessories installed in the vehicle, special vehicle features, and/or any after-market components installed on the vehicle. In some embodiments, the server 105 may further obtain or determine yearly insurance premium costs based upon the type of vehicle, a number of miles driven per year, a total number of accidents for the vehicle resulting in insurance claims, a number of speeding tickets, customer personal information, a good student discount, a multi-vehicle discount, and/or a discount for bundling vehicle and home insurance policies.

At block 414, the server 105 may extract features to train the machine learning algorithm. In some examples the features extracted to determine the total cost of ownership of the vehicle may include: (i) cost of the initial vehicle purchase, (ii) taxes paid for the initial vehicle purchase, (iii) yearly taxes paid, (iv) yearly maintenance costs, (v) yearly fuel costs, (vi) yearly insurance premium costs, and/or (vii) a loan cost (including interest on the loan).

Block 420 may include blocks 422 and 424. At block 422, the ML model is trained based upon the data obtained at block 410. In some embodiments where associated information is included in the historical information, the ML model "learns" an algorithm capable of calculating or predicting the target feature values (e.g., determining costs, etc.) given the predictor feature values.

At block 424, the one or more processors 120 may evaluate the ML model and determine whether or not the ML model is ready for deployment. Evaluating the ML model may include testing the model using testing data or validating the model using validation data. Testing/validation data typically includes both predictor feature values and target feature values (e.g., including known inputs and outputs), enabling comparison of target feature values predicted by the model to the actual target feature values, enabling evaluation of the performance of the ML model. This testing/validation process is valuable because the model, when implemented, will generate target feature values for future input data that may not be easily checked or validated. Thus, it is advantageous to check one or more accuracy metrics of the ML model on data for which the target answer is already known (e.g., testing data or validation data, such as data including historical information), and use this assessment as a proxy for predictive accuracy of the ML model when applied to future data. Exemplary accuracy metrics include key performance indicators, comparisons between historical trends and predictions of results, cross-validation with subject matter experts, comparisons between predicted results and actual results, etc.

At block 430, the one or more processors 120 may run the ML model by applying it to generate output from addition data for one or more users. Running the ML model may comprise distributing or providing access to the ML model to a plurality of user devices 102 in order to provide recommendations to users regarding vehicle purchases upon request or in response to user input indicating interest in or recent purchase of a vehicle. In some embodiments, ML algorithms may be used to determine the recommendations for how to decrease the total cost of ownership of a vehicle. For example, the one or more processors 120 may use the ML algorithms to determine how particular types of vehicles, particular models, particular years of manufacture may affect the total cost. The ML algorithm may further determine how a number of miles driven per year, a total number of accidents for the vehicle resulting in insurance claims, a number of speeding tickets, customer personal information, a good student discount, etc. may affect the total cost of ownership. The ML algorithm may present various costs depending on various features and factors to decrease the total cost of ownership.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The systems and methods described herein are directed to an improvement to computer functionality and improve the functioning of conventional computers. Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules include a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for evaluation properties, through the principles disclosed herein. Therefore, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality and improve the functioning of conventional computers.

What is claimed:

1. A computer-implemented method for generating recommendations regarding a vehicle purchase, the method comprising:
   obtaining, via a chatbot or voicebot implemented by one or more processors and implementing artificial intelligence (AI) or machine learning (ML), customer input indicating an interest in purchasing a vehicle;
   determining, via the chatbot or voicebot, vehicle information about a type of the vehicle based upon the customer input, wherein the vehicle information includes a plurality of vehicle features;
   determining, via the chatbot or voicebot, customer personal information associated with customer, wherein the customer personal information includes a plurality of characteristics of the customer;
   determining, via the chatbot or voicebot, a personalized insurance cost for the customer insuring the vehicle based upon the customer personal information and the vehicle information;
   determining, via the chatbot or voicebot, a total cost of ownership of the vehicle based upon the type of the vehicle and the personalized insurance cost, wherein the total cost of ownership includes current and future costs associated with purchasing, maintaining, and insuring the vehicle; and
   presenting, via the chatbot or voicebot, the total cost of ownership of the vehicle to the customer.

2. The computer-implemented method of claim 1, wherein the customer input comprises text received by the chatbot, and further comprising:
   applying, via the chatbot, a natural language processing (NLP) algorithm to the text to generate a word or phrase; and
   wherein:
   (i) obtaining the customer input comprises updating the customer input to include the customer personal information based upon the word or phrase; or
   (ii) determining the vehicle information about the type of the vehicle comprises determining a vehicle make, a vehicle model, and a year of vehicle manufacture based upon the word or phrase.

3. The computer-implemented method of claim 1, wherein the customer input comprises audio data received by the voicebot, and further comprising:
   applying, via the voicebot, an audio recognition algorithm to the audio data to generate text; and
   applying, via the voicebot, a natural language processing (NLP) algorithm to the text to generate a word or phrase; and
   wherein:
   (i) obtaining the customer input comprises updating the customer input to include the customer personal information based upon the word or phrase; or
   (ii) determining the vehicle information about the type of the vehicle comprises determining a vehicle make, a vehicle model, and a year of vehicle manufacture based upon the word or phrase.

4. The computer-implemented method of claim 1, wherein the vehicle information about the vehicle comprises a plurality of the following: a vehicle make, a vehicle model, a vehicle year of manufacture, a number of miles, a number of accidents, any body damage to the vehicle, any interior damage to the vehicle, any accessories installed in the vehicle, special vehicle features, or any after-market components installed on the vehicle.

5. The computer-implemented method of claim 1, wherein the total cost of ownership of the vehicle comprises: (i) a cost of an initial vehicle purchase, (ii) taxes for the initial vehicle purchase, (iii) yearly taxes, (iv) yearly maintenance costs, (v) yearly fuel costs, (vi) yearly insurance premium costs, and (vii) a loan cost.

6. The computer-implemented method of claim 1, wherein the personalized insurance cost includes yearly insurance premium costs, and determining the personalized insurance costs comprises:
   determining, via the chatbot or voicebot, the yearly insurance premium costs based upon the type of the vehicle, a number of miles driven per year, a total number of accidents for the vehicle resulting in insurance claims, a number of speeding tickets, and the customer personal information.

7. The computer-implemented method of claim 1, wherein the chatbot or voicebot includes at least one of a generative chatbot model, a deep learning algorithm, a generative pre-trained transformer (GPT), or a long short-term memory (LSTM) network.

8. A computer system for generating recommendations regarding a vehicle purchase, the computer system comprising:
   one or more processors; and
   one or more memories storing computer-executable instructions that, when executed by the one or more processors, cause the one or more processors to implement a chatbot or voicebot implementing artificial intelligence (AI) or machine learning (ML) to:
   obtain, via the chatbot or voicebot, customer input indicating an interest in purchasing a vehicle;
   determine, via the chatbot or voicebot, vehicle information about a type of the vehicle based upon the customer input, wherein the vehicle information includes a plurality of vehicle features;
   determine, via the chatbot or voicebot, customer personal information associated with customer, wherein the customer personal information includes a plurality of characteristics of the customer;
   determine, via the chatbot or voicebot, a personalized insurance cost for the customer insuring the vehicle based upon the customer personal information and the vehicle information;
   determine, via the chatbot or voicebot, a total cost of ownership of the vehicle based upon the type of the vehicle and the personalized insurance cost, wherein the total cost of ownership includes current and future costs associated with purchasing, maintaining, and insuring the vehicle; and
   present, via the chatbot or voicebot, the total cost of ownership of the vehicle to the customer.

9. The computer system of claim 8, wherein the computer system further comprises a display device, and wherein the one or more processors are further configured to present the total cost of ownership of the vehicle on the display device.

10. The computer system of claim 8, wherein:
   the customer input comprises text received by the chatbot; and the computer-executable instructions further cause the one or more processors to:
apply, via the chatbot, a natural language processing (NLP) algorithm to the text to generate a word or phrase; and
perform at least one of the following:
(i) update the customer input to include the customer personal information based upon the word or phrase; or
(ii) determine a vehicle make, a vehicle model, and a year of vehicle manufacture based upon the word or phrase as at least part of the vehicle information about the type of the vehicle.

11. The computer system of claim 8, wherein:
the customer input comprises audio data received by the voicebot; and
the computer-executable instructions further cause the one or more processors to:
apply, via the voicebot, an audio recognition algorithm to the audio data to generate text; and
apply, via the voicebot, a natural language processing (NLP) algorithm to the text to generate a word or phrase; and
perform at least one of the following:
(i) update the customer input to include the customer personal information based upon the word or phrase; or
(ii) determine a vehicle make, a vehicle model, and a year of vehicle manufacture based upon the word or phrase as at least part of the vehicle information about the type of the vehicle.

12. The computer system of claim 8, wherein the vehicle information about the vehicle comprises a plurality of the following: a vehicle make, a vehicle model, a vehicle year of manufacture, a number of miles, a number of accidents, any body damage to the vehicle, any interior damage to the vehicle, any accessories installed in the vehicle, special vehicle features, or any after-market components installed on the vehicle.

13. The computer system of claim 8, wherein the total cost of ownership of the vehicle comprises: (i) a cost of an initial vehicle purchase, (ii) taxes for the initial vehicle purchase, (iii) yearly taxes, (iv) yearly maintenance costs, (v) yearly fuel costs, (vi) yearly insurance premium costs, and (vii) a loan cost.

14. The computer system of claim 8, wherein:
the personalized insurance cost includes yearly insurance premium costs; and
the computer-executable instructions that cause the one or more processors to determine the personalized insurance cost further cause the one or more processors to determine, via the chatbot or voicebot, the yearly insurance premium costs based upon the type of the vehicle, a number of miles driven per year, a total number of accidents for the vehicle resulting in insurance claims, a number of speeding tickets, and the customer personal information.

15. The computer system of claim 8, wherein the chatbot includes at least one of a generative chatbot model, a deep learning algorithm, a generative pre-trained transformer (GPT), or a long short-term memory (LSTM) network.

16. A non-transitory computer-readable medium storing computer-executable instructions for generating recommendations regarding a vehicle purchase that, when executed by one or more processors, cause the one or more processors to implement a chatbot or voicebot implementing artificial intelligence (AI) or machine learning (ML) to:
obtain, via the chatbot or voicebot, customer input indicating an interest in purchasing a vehicle;
determine, via the chatbot or voicebot, vehicle information about a type of the vehicle based upon the customer input, wherein the vehicle information includes a plurality of vehicle features;
determine, via the chatbot or voicebot, customer personal information associated with customer, wherein the customer personal information includes a plurality of characteristics of the customer;
determine, via the chatbot or voicebot, a personalized insurance cost for the customer insuring the vehicle based upon the customer personal information and the vehicle information;
determine, via the chatbot or voicebot, a total cost of ownership of the vehicle based upon the type of the vehicle and the personalized insurance cost, wherein the total cost of ownership includes current and future costs associated with purchasing, maintaining, and insuring the vehicle; and
present, via the chatbot or voicebot, the total cost of ownership of the vehicle to the customer.

17. The non-transitory computer-readable medium of claim 16, wherein:
the customer input comprises text received by the chatbot; and
the computer-executable instructions further cause the one or more processors to:
apply, via the chatbot, a natural language processing (NLP) algorithm to the text to generate a word or phrase; and
perform at least one of the following:
(i) update the customer input to include the customer personal information based upon the word or phrase; or
(ii) determine a vehicle make, a vehicle model, and a year of vehicle manufacture based upon the word or phrase as at least part of the vehicle information about the type of the vehicle.

18. The non-transitory computer-readable medium of claim 16, wherein:
the customer input comprises audio data received by the voicebot; and
the computer-executable instructions further cause the one or more processors to:
apply, via the voicebot, an audio recognition algorithm to the audio data to generate text; and
apply, via the voicebot, a natural language processing (NLP) algorithm to the text to generate a word or phrase; and
perform at least one of the following:
(i) update the customer input to include the customer personal information based upon the word or phrase; or
(ii) determine a vehicle make, a vehicle model, and a year of vehicle manufacture based upon the word or phrase as at least part of the vehicle information about the type of the vehicle.

19. The non-transitory computer-readable medium of claim 16, wherein:
the personalized insurance cost includes yearly insurance premium costs; and
the computer-executable instructions that cause the one or more processors to determine the personalized insurance cost further cause the one or more processors to determine, via the chatbot or voicebot, the yearly insurance premium costs based upon the type of the vehicle, a number of miles driven per year, a total number of accidents for the vehicle resulting in insurance claims, a number of speeding tickets, and the customer personal information.

20. The non-transitory computer-readable medium of claim 16, wherein the chatbot or voicebot includes at least one of a generative chatbot model, a deep learning algorithm, a generative pre-trained transformer (GPT), or a long short-term memory (LSTM) network.

* * * * *